(12) United States Patent
Garcia

(10) Patent No.: US 6,883,170 B1
(45) Date of Patent: Apr. 19, 2005

(54) METHOD AND SYSTEM TO MAINTAIN A HIERARCHY OF INSTANTIATED APPLICATION OBJECTS AND TO ENABLE RECOVERY FROM AN APPLICATIONS FAILURE

(75) Inventor: Kevin Garcia, Granite Bay, CA (US)

(73) Assignee: Aspect Communication Corporation, San Jose, CA (US)

(*) Notice: Subject to any disclaimer, the term of this patent is extended or adjusted under 35 U.S.C. 154(b) by 404 days.

(21) Appl. No.: 09/651,438
(22) Filed: Aug. 30, 2000
(51) Int. Cl.[7] .............................................. G06F 17/00
(52) U.S. Cl. ........................ 718/1; 714/15; 714/17; 714/18; 714/19; 714/20; 714/48; 714/49; 707/1; 707/10; 707/200; 707/202
(58) Field of Search .................. 714/15–20, 48–49, 714/51; 707/1–10, 200, 202; 718/1; 709/1–108

(56) References Cited

U.S. PATENT DOCUMENTS

| | | | | |
|---|---|---|---|---|
| 5,524,241 A | * | 6/1996 | Ghoneimy et al. | 707/10 |
| 5,546,455 A | | 8/1996 | Joyce et al. | |
| 5,706,500 A | * | 1/1998 | Dzikewich et al. | 707/10 |
| 5,734,817 A | * | 3/1998 | Roffe et al. | 714/15 |
| 5,790,419 A | * | 8/1998 | Matsuda et al. | 700/79 |
| 5,799,323 A | * | 8/1998 | Mosher et al. | 707/202 |
| 6,073,157 A | * | 6/2000 | Horiguchi et al. | 709/100 |

* cited by examiner

Primary Examiner—Meng-Al T. An
Assistant Examiner—Phuong N. Hoang
(74) Attorney, Agent, or Firm—Schwegman, Lundberg, Woessner & Kluth, P.A.

(57) ABSTRACT

A method of maintaining a hierarchy of application objects commences with the automatic detection of the exit of a process of a child application object in an unexpected manner. Responsive to the detected exit, a grandchild application object, launched by the child application object, is automatically terminated. An attempt is then made to restart the child application object. The outcome of the restart of the child application object is reported to a parent application object that launched the child application object.

16 Claims, 12 Drawing Sheets

METHOD AND SYSTEM TO MAINTAIN A HIERARCHY OF INSTANTIATED APPLICATION OBJECTS AND TO ENABLE RECOVERY FROM AN APPLICATIONS FAILURE

FIELD OF THE INVENTION

The present invention relates generally to the processing, storing and accessing of information within an information processing system. More particularly, the present invention relates to the maintenance of a hierarchy of instantiated applications.

BACKGROUND OF THE INVENTION

Within an interaction system (e.g., a call center), a complex hierarchy of application objects may be instantiated to handle various tasks (or jobs). Specifically, where a number of application objects are instantiated and operate in parallel concurrently to perform a number of tasks, a complex hierarchical arrangement of application objects may exist. The hierarchical structure of the application objects may result, for example, as a result of a particular application object requiring the services of a further application object. In this case, application object may cause the instantiation of a dependent (or child) application object that initiates a process specifically to service a requirement of a parent application object. The child application object may, in turn, instantiate further child application objects to service its own informational requirements, and so on. In this way, a multi-level heierarchy of application objects may be established.

When a specific process of an application object fails, it will be appreciated that this failure will impact both parent and child application objects of the application object for which the failure occurred.

SUMMARY OF THE INVENTION

According to the invention there is provided a method of maintaining a hierarchy of application objects. The exit of a child application object is automatically detected. A grandchild application object, launched by the child application object is automatically terminated. The restart of the child application object is attempted. An outcome of the restart is signaled to a parent application object that launched the child application object.

Other features of the present invention will be apparent from the accompanying drawings and from the detailed description which follows.

BRIEF DESCRIPTION OF THE DRAWINGS

The present invention may be illustrated by way of example and not limitation in the figures of the accompanying drawings, in which like references indicate some elements in which.

DETAILED DESCRIPTION

A method and system to maintain a hierarchy of instantiated application objects are described. In the following description, for the purposes of explanation, numerous specific details are set forth in order to provide a thorough understanding of the present invention. It will be evident, however, to one skilled in the art that the present invention may be practiced without these specific details.

Interaction Environment Overview

Figure 1:
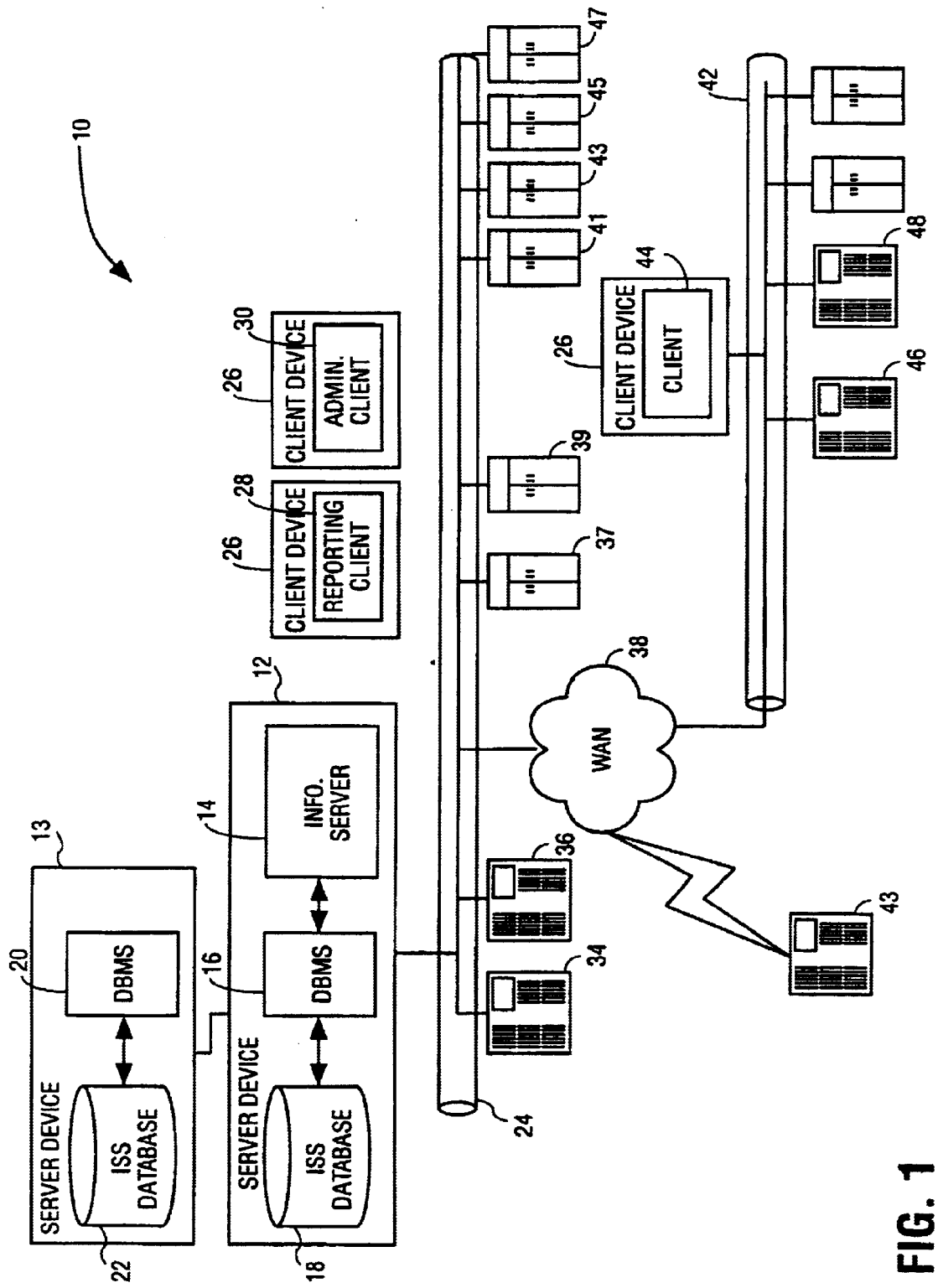
FIG. 1 is a diagrammatic representation of an exemplary interaction environment within which the present invention may be employed.

FIG. 1 is a diagrammatic representation of an exemplary interaction environment 10 within which the present invention may be employed. The interaction environment 10 includes a server device 12 that hosts an information server 14 and a database management system (DBMS) 16. The information server 14 collects, processes, consolidates and provides access to near-real-time and historical interaction data generated by, and pertaining to, multiple interaction systems (e.g., ACDs, e-mail servers, web servers, Computer Telephony Integration (CTI) servers, and Interactive Voice Response (IVR) workflow servers, other workflow servers or network routers) and other devices, within the environment 10. The information server 14 accordingly functions as a framework for capturing, summarizing and storing such interaction data from multiple sources, as will be described below.

The DBMS 16 may, for example, be the Oracle8 Server developed by Oracle Corp. of Redwood City, Calif., or the Sybase SQL Server developed by Sybase, Inc. of Emeryville, Calif., and comprises a collection of programs that maintain and facilitate access to a database 18. The database 18 includes information (e.g., both data and metadata) regarding resource configurations, interactions and other environment parameters, conditions and functions (e.g., call, agent and trunk events, fact records and summaries). A mirror server device 13, in one exemplary configuration, hosts a replicated DBMS 20 that may be implemented using the Oracle Advanced Replication Server, and that maintains and facilitate access to a replicated database 22. The replicated DBMS 20 may be utilized as a standby or redundant system, or to generate historical reports. In an alternative configuration, the information server 14 may reside on the server device 12, and the DBMS 16 may reside on the server device 13 to facilitate off-board performance gains as the resources of the server device 12 are devoted exclusively to the information server 14.

The server device 12 is coupled by a Local Area Network (LAN) 24 to network devices 26, each of which hosts a software client. Of course, in an alternative embodiment, the LAN 24 may replaced by any network type, such as for example a Wide Area Network (WAN). The software clients may include a reporting client 28 and an administrative client 30. The reporting client 28 may be any Open Database Connectivity (ODBC) compliant application, and makes queries against the database 18, and formats the results of these queries based on a predefined set of instructions (i.e., a report definition). The reporting client 28 may further include a scheduler for scheduling reports to run at predetermined times. The administrative client 30 may be a Microsoft Foundation Class (MFC) 4.0 application, and could accordingly reside on a Windows 95, Windows NT workstation or Windows NT Server platform. The administrative client 30 facilitates configuration and management of the information server 14 on the server device 12. For example, utilizing a graphical user interface (GUI) provided by the administrative client 30, a system administrator may define data sources, set data destinations, specify rules, formulas and frequencies for data summaries, view server system metadata information, events, and task statuses. The administrative client 30 communicates with server components of the information server 14 through an Application Program Interface (API) that makes use of Remote Procedure Call (RPC) to facilitate remote management of the information server 14 over the LAN 24 or over a Wide Area Network (WAN) 38.

Also coupled to the LAN 24 (or a WAN in an alternative embodiment) are a pair of interaction systems in the exemplary forms of Automatic Call Distributors (ACDs) 34 and 36, a workflow server 37, a network router 39, a CTI server 41, an IVR server 43, an e-mail server 45, and a web server 47. Each of the ACDs 34 and 36 is typically coupled to a Public Switched Telephone Network (PSTN) (not shown) via which the respective ACDs may receive transaction requests (e.g., phone calls from telephone units, such as those used in homes or businesses). Each of the ACDs 34 and 36 may also be coupled to the Internet, an Intranet, or any other network over which a transaction may be initiated. Also coupled to each of the ACDs 34 and 36 are a number of network devices (not shown) in the form of agent computers or telephone units via which human agents and/or software agents interact with a respective ACD and with customers.

The WAN 38 couples the LAN 24 to a remote LAN 42 and to a further ACD 34. A network device 26, and a further pair of ACDs 46 and 48 (or other interaction systems), are coupled to the remote LAN 42.

Data Path

Figure 2:
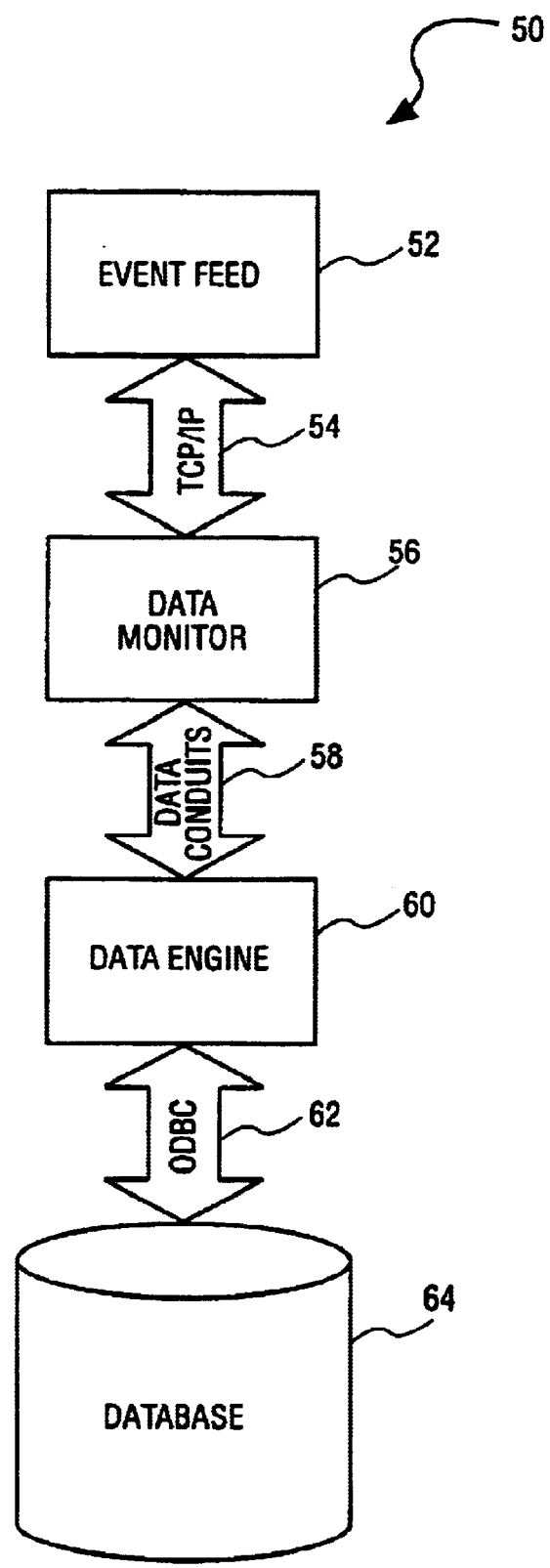
FIG. 2 is a block diagram illustrating a data path, according to an exemplary embodiment of the present invention, implemented within the interaction environment.

FIG. 2 is a block diagram showing a data path 50, according to one exemplary embodiment of the present invention, implemented within the interaction environment 10. The data path 50 begins with an event feed 52, which may be TCP/IP based. Specifically, an event feed 52 may facilitate the supply of data from an interaction system (e.g., an ACD or other server) to the information server 14, concerning interaction system activity. The event feed 52 may be implemented by an event feed server (hosted on an interaction system) that supplies an event feed client within the information server 14 (hosted on the server device 12) with, merely for example, interaction detail records, daily summaries, or information regarding agent, call, trunk or configuration events. The event feed server is responsible for gathering unprocessed interaction data from the various interaction subsystems of an interaction system, and for the feeding of this interaction data to the event feed client. The event feed server also provides a fault tolerant link, for example utilizing the Remote Procedure Call (RPC) protocol, between the event feeder server and event feed client, and handles backup and online re-synchronization functions.

A data monitor 56 processes both data and configuration messages received from the event feed 52 via a Transmission Control Protocol/Internet Protocol (TCP/IP) connection 54. Specifically, the data monitor 56 may transform the unprocessed interaction data received from the event feed 52 into "fact records" (e.g., call fact records, trunk fact records and agent fact records). From the data monitor 56, fact records are propagated via data conduits 58 to a data engine 60 that buffers and summarizes the fact records, and performs block writes of records into a database 64 utilizing the Open DataBase Connectivity (ODBC) protocol, as indicated at 62. The use of the ODBC protocol provides portability to other databases.

Interaction Systems

Figure 3:
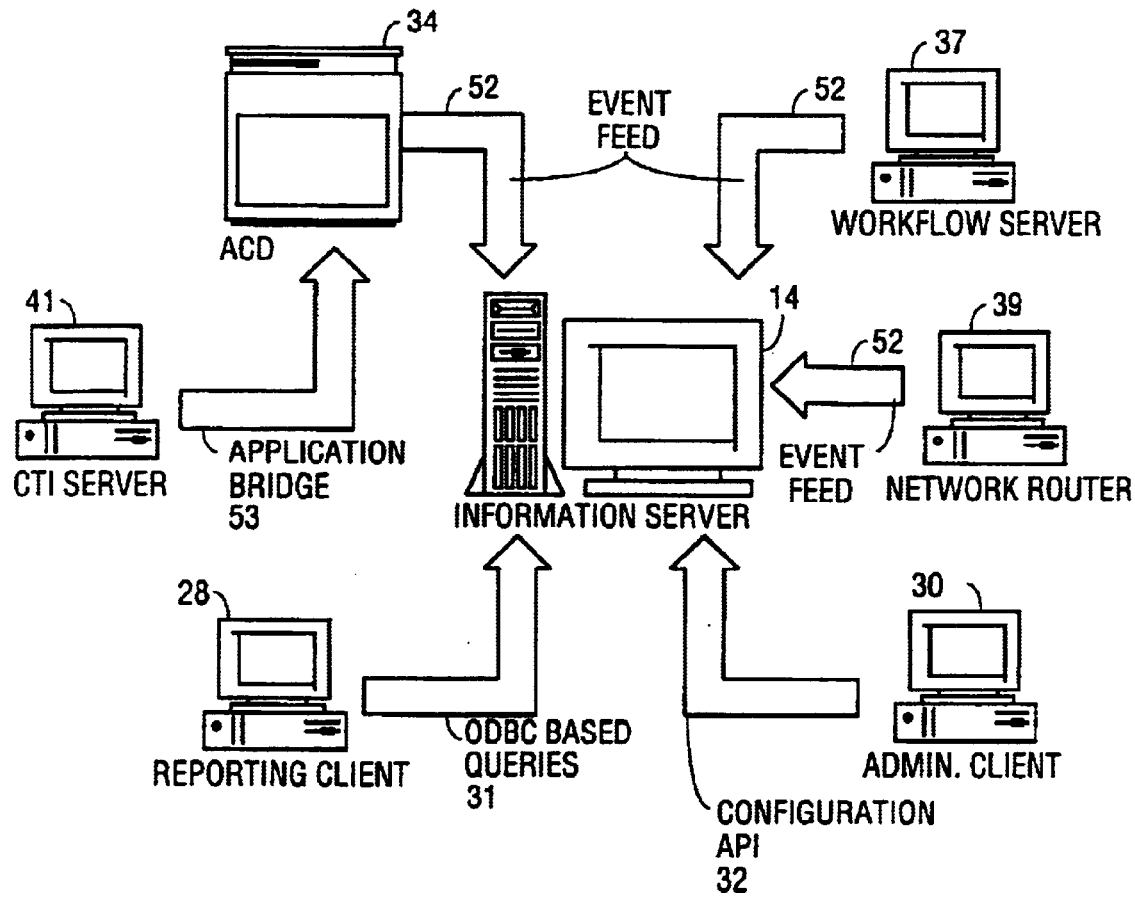
FIG. 3 is a diagrammatic representation of an exemplary interaction system within the interaction environment that may provide input to an information server.

FIG. 3 is a diagrammatic representation of exemplary interaction systems within an interaction environment 10 that may provide input to an information server 14. FIG. 3 illustrates, at a conceptual level, how respective event feeds 52, as well as other mechanisms and protocols, contribute to the supply data to the information server 14. For example, respective event feeds 52 are shown to provide interaction data from the ACD 34, the workflow server 37 and the network router 39 to the information server 14. The administrative client 30 is shown to provide input to the information server 14 via an Application Program Interface (API) 32, while the reporting client 28 is shown to propagate ODBC-based queries 31 to the information server 14. Finally, the CTI server 41 is shown to communicate with the ACDs 34 via a customized application bridge 53.

The Information Server-Overview

Figure 4:
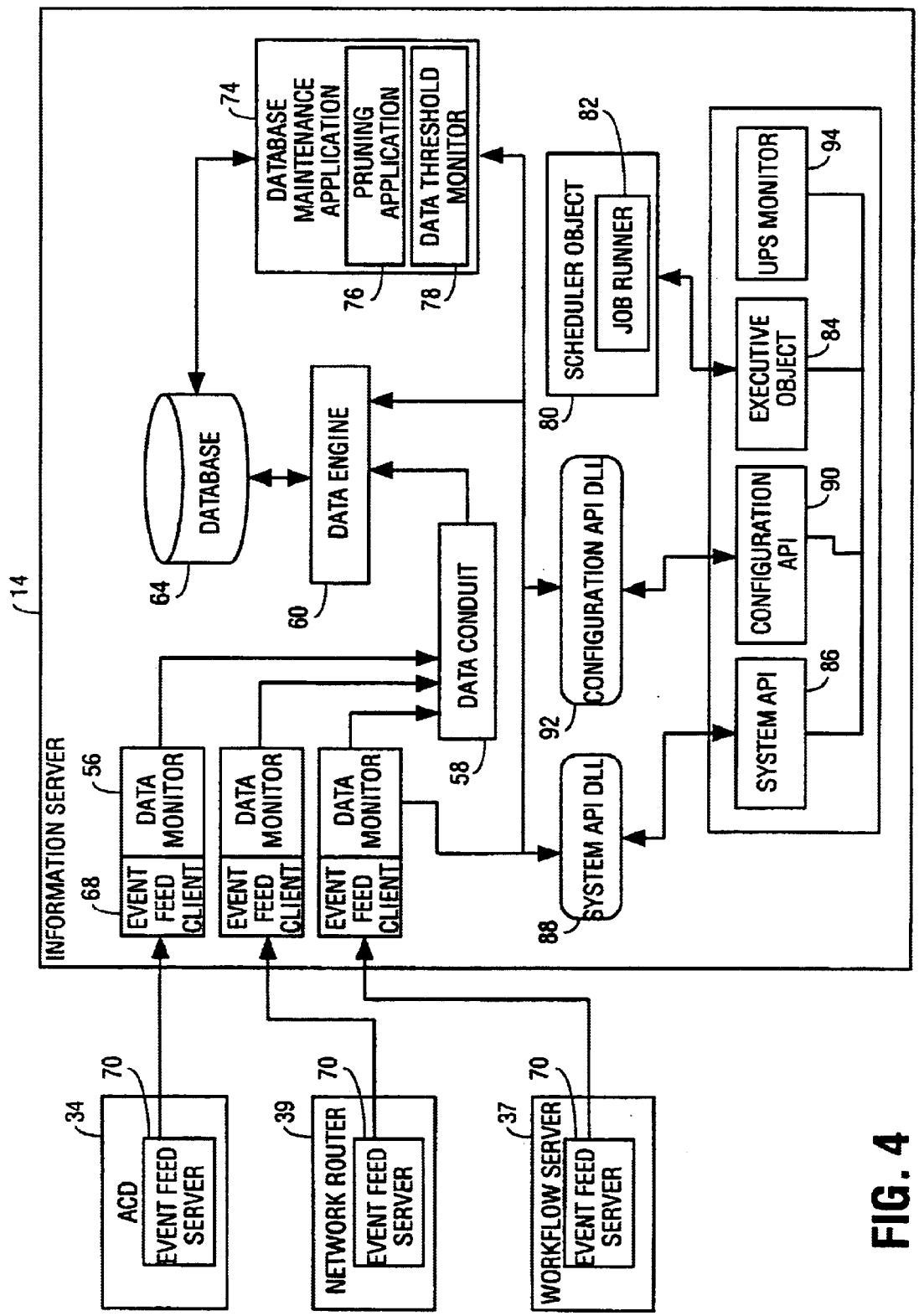
FIG. 4 is a block diagram illustrating the architecture of an information server, according to an exemplary embodiment of the presentation invention, hosted on a server device.

FIG. 4 is a block diagram illustrating the architecture of an exemplary information server 14 hosted on the server device 12. The information server 14 includes a number of event feed clients 68, each of which receives unprocessed interaction information from an associated event feed server 70 hosted on a respective interaction system. In one embodiment, a number of separate event feed server-client pairs are provided to facilitate the provision of unprocessed interaction information to the information server 14 from different types of interaction systems that may implement different event reporting protocols. For example, a first event feed server-client pair may be utilized to provide unprocessed interaction information to the information server 14 from an ACD 34 from a specific manufacturer, a second event feed server-client pair may be utilized to provide unprocessed interaction information to the information server 14 from a network router 39, and a third event feed server-client pair may be utilized to provide unprocessed interaction information to the information server 14 from a workflow server 37. Further event feed server-client pairs may be utilized to provide information to the information server 14 from other devices or information resources.

In one exemplary embodiment of the present invention, an event feed server-client pair servicing an ACD 34 collects and buffers information concerning call events, agent events, trunk events and database events. Tables 1–3 below provide examples of call events, agent events, and trunk events respectively that cause an event feed server 70, hosted on an exemplary ACD 34, to send a message concerning the event to an associated event feed client 68 within the information server 14:

TABLE 1

| EVENT | DESCRIPTION |
| --- | --- |
| Call Noticed | The ACD first notices the presence of a call |
| Call Offered | A call is offered to a teleset and the teleset starts to ring |
| Call Disconnected | A call is disconnected |
| Call Held | A call is put on hold |
| Call Retrieved | A call is retrieved after being on hold |
| Call Transferred | A call is transferred to another agent or IVR |
| Call Conferenced | An agent enters a conference call |

TABLE 2

| EVENT | DESCRIPTION |
| --- | --- |
| Agent Logged On | An agent signs on to a teleset |
| Agent Logged Off | An agent signs off |
| Agent Idle | An agent pushes the idle button |
| Agent Available | An agent pushes the available button |
| Agent Wrap-Up | An agent is performing after-call work |
| Agent Reserved | An agent is put on reserved state to prepare for a call |
| Agent Makes Outbound | Agent begins an outbound call |
| Agent Makes Inside | Agent makes an inside call |
| Resource Released | An agent or other resource is released |

TABLE 3

| EVENT | DESCRIPTION |
| --- | --- |
| Trunk Seized | A truck is selected and reserved for an outbound call |
| Resource Released | A trunk or other resource is released |

Database events which may cause an event feed server 70 hosted on an ACD 34 to send a database event message to an associated event feed client 68 include additions, deletions or other updates to a specific table within the ACD 34.

Other messages sent by an event feed server 70 hosted on an ACD 34 might include time strobe messages and keep-alive messages. Time strobe messages are sent at the end of predetermined time intervals (e.g., one minute intervals), the time strobe messages guaranteeing to an associated event feed client 68 that the event feed server 70 will send no further event messages within a specific and predetermined time interval. Keep-alive messages are sent periodically to monitor the status of a connection between the ACD 34 and the information server 14.

An event feed server-client pair servicing a network router 39, in one exemplary embodiment, generate route data records for the relevant network router 39. Each route data record may be assembled utilizing two messages propagated from the event feed server 70 to the event feed client 68. A first message contains information regarding an initial interaction request and a second message contains information regarding how the network router handled the interaction request. The event feed client 68 assembles these two messages into a single route data record that is available for storage and summarization. The event feed server 70 of a network router 39 may also send a number of database event messages to an event feed client 68, the database event messages corresponding substantially to those propagated by the event feed client of an ACD 34.

An event feed server-time servicing a workflow server 37, in one exemplary embodiment, may utilize workflow data messages, in addition to time strobes, to communicate information to the information server 14. For purposes of the present specification, the term "workflow" shall be taken to refer to any predetermined sequence of operations that are performed by an interaction system in the processing of a an interaction. For example, each execution of a workflow by a workflow server may generate a workflow message, containing information regarding the workflow and a specific execution instance.

Each event feed client 68 is associated with a respective data monitor 56, each data monitor 56 propagating fact records to a data engine 60 via a data conduit 58. From the data engine 60, summarized transaction information is written to the database 64 utilizing the ODBC protocol 62. The data conduit 58 operates to facilitate communication between, in one exemplary embodiment, (1) the data engine 60 and custom applications which may be implemented within the information server 14, and (2) the data monitors 56, each of which may be associated with an external interaction system. To this end, the data conduit 58 includes a set of functions that may be exported to custom applications within the information server 14. For example, the functions exported from the data conduit 58 may allow an application to allocate and free shared memory record structures, pass shared memory record structures between applications, define records of interest, and read the form (or catalog) of a memory record structure. Specifically, utilizing the appropriate function, an application may read the number of fields, type and name of each field, and ordinal of each field within a memory record structure (or table).

The information server 14 further includes database maintenance applications 74 that include two primary applications, namely a pruning application 76, and a data threshold monitor 78 that together operate to maintain the data space usage within the database 64 within predefined boundaries, thereby preventing data space overflows. The pruning application 76 is responsible for pruning database tables within the database 64, and is launched by an executive object 84, that may be triggered by a scheduler object 80 associated with a schedule event (or schedule entry). The data threshold monitor 78 provides a system Application Program Interface (API) for implementing and decrementing row counters for tables within the database 64. The data threshold monitor 78 furthermore launches the pruning application 76 when a table within the database 64 exceeds a predetermined threshold number of rows.

A scheduler object 80 typically schedules "jobs" or application process within the information server 14 on hourly, daily, weekly or monthly schedules. To this end, a scheduler object 80 may include a "job runner" application 82 that, in one exemplary embodiment, is launched by the Windows NT schedule service, and that coordinates with the executive object 84 to execute each job within the job group associated with a schedule entry. The job runner application 82 furthermore calls a system API from a system API module 86 via the system API Dynamic Link Library (DLL) 88 to schedule the next time at which the job runner application 82 should be launched to process a respective schedule entry.

The executive object 84 exercises control over the various software applications within the information server 14, such as the data monitors 56, the data engine 60 and possibly other custom applications. The executive object 84 is responsible for the start-up and shutdown of the software applications and, to this end, issues START and STOP control messages to the various applications. The executive object 84 also issues ADD and REMOVE conduit service messages to establish and tear down conduits between various applications. A configuration API module 83 is a Remote Procedure Call (RPC)-based set of functions that may be exported to various applications via a configuration API DLL 92. For example, the functions exported from the configuration API module 83 may allow an application to (1) enumerated, create, delete, read or write configuration metadata read from the database 64, and also to (2) start and stop other applications, such as a data monitor 56 and the data engine 60. A system API module 86 similarly is an RPC-based set of functions that may be exported to various applications via the system API DLL 88. For example, the functions exported from the system API module 86 may allow an application to request data feeds from other applications, and to add, delete and update data source supplied configuration data, such as user, group or application configuration data. Further exported functions may allow an application to log events in a system event log, and to increment and decrement database threshold counters.

The information server 14 also includes an Uninterruptible Power Supply (UPS) monitor 97 that monitors UPS messages sent by, for example, a Windows NT® UPS service. The UPS monitor 97 then coordinates with the executive object 84 to shutdown appropriate parts of the information server 14.

Information Server

Figure 5:
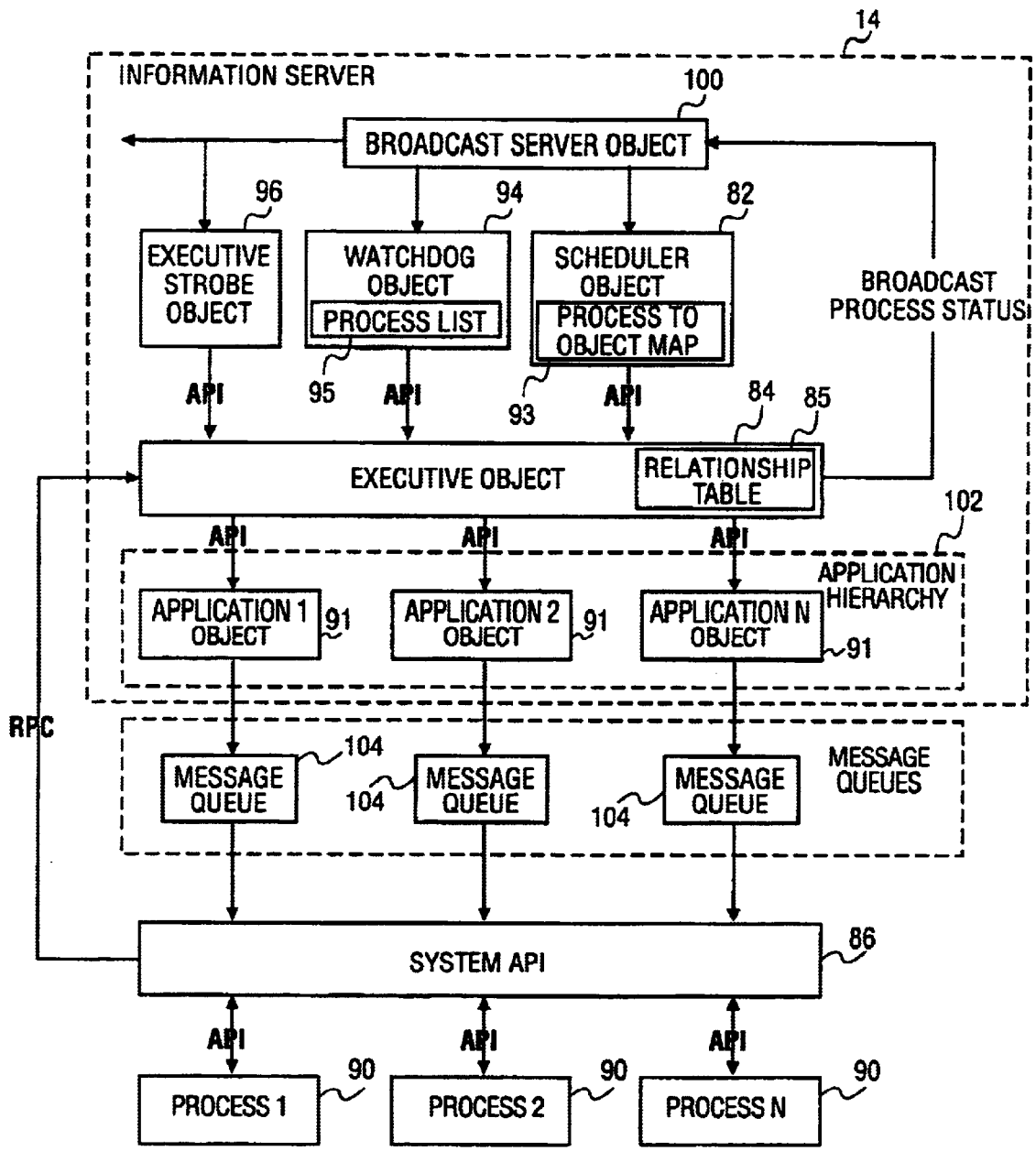
FIG. 5 is a block diagram illustrating further architectural details of the information server pertaining to an executive, according to an exemplary embodiment of the present invention.

FIG. 5 is a block diagram illustrating further details of an exemplary embodiment of the information server 14, specifically of components that interact with the executive object 84. As described above, the executive object 84 exercises control over the software applications within the information server 14. Among the functions performed by the executive object 84 is the maintenance of a hierarchy of application objects (i.e., application dependencies), the handling, and possible recovery from, a failure by a specific application object, starting and stopping the execution of application objects, providing keep-alive and watchdog services, and performing application restarts. The executive object 84 tracks dependencies between application objects on an on-going basis, and also tracks application object ownership on an application-by-application basis. The executive object 84 furthermore utilizes dependency and ownership information to facilitate failure recovery by taking appropriate steps to restart an application, as opposed to simply reporting an application failure. Accordingly, the executive object 84 seeks to provide a user-transparent failure recovery mechanism.

More specifically, the executive object 84 is responsible for implementing a "keep alive" mechanism that is utilized to detect hung, or failed, application objects and to communicate with other interaction environment 10 components responsive to such an application object failure. In one embodiment, these communications are facilitated through broadcast server and client objects, as will be described in further detail below. At high level, broadcast server objects are utilized to communicate with further objects within the context of the information server 14, whereas broadcast client objects are utilized to communicate to applications outside the context of the information server 14 (e.g., data monitors 56).

FIG. 5 shows that the executive object 84 receives input from a number of objects, including a watchdog object 94 that maintains a process list 95 of all processes 90 performed by application objects 91 created by the executive object 84.

The watchdog object 94 furthermore detects when a process 90 exits (e.g., as a result of a failure, being instructed to do so, or upon completion). Upon detection of a process exit, the watchdog object 94 signals the executive object 84, to thereby advise the executive object of the process exit.

The scheduler object 80, as described above, schedules processes 90 within the context of the information server 14 based on, for example, hourly, daily, weekly or monthly schedules and dependencies between processes 90. To this end, the scheduler object 80 maintains a process-to-application object map 93 and also tracks dependencies between processes.

An executive strobe object 96 acts as a "clock" to the executive object 84, and prompts the executive object to take certain actions at predetermined time intervals (e.g., every fifteen seconds).

The executive object 94 is shown to broadcast process status information to a broadcast server object 100, that then broadcasts this process status information to multiple objects within the context of the information server 14. The executive object 84 is also shown to create an application hierarchy 102, comprising a collection of application objects 91. The executive object 84 communicates with each of the application objects 91 through an appropriate API. Each application object 91 has an associated message queue 104 into which the relevant application object 91 outputs messages for communication to other system components via the system API 86. For example, the system API 86 is shown to retrieve messages from the respective message queues 104, and to issue appropriate communications, utilizing a RPC, to the executive object 84.

Each of the processes 90, initiated by a respective application object 91, are also show to communicate with components of the information server 14 utilizing the system API 86.

The executive object 84 also maintains a relationship table 85, that reflects relationships between application objects 91. It will be appreciated that the application objects 91 may be instantiated from any one of the applications discussed above, including the pruning application 76, the data threshold monitor 78, or any of the discussed components of the information server 14. For example, a data monitor application object may depend upon a data engine object, which may in turn depend upon a custom application object. From the relationships between various application objects 91, the relationship table 85 is built to reflect these dependencies. This information is used, in part, to determine which applications start before others, and to maintain a record of the relevant dependencies.

Methodology—Creation of Application Hierarchy

Figure 6:
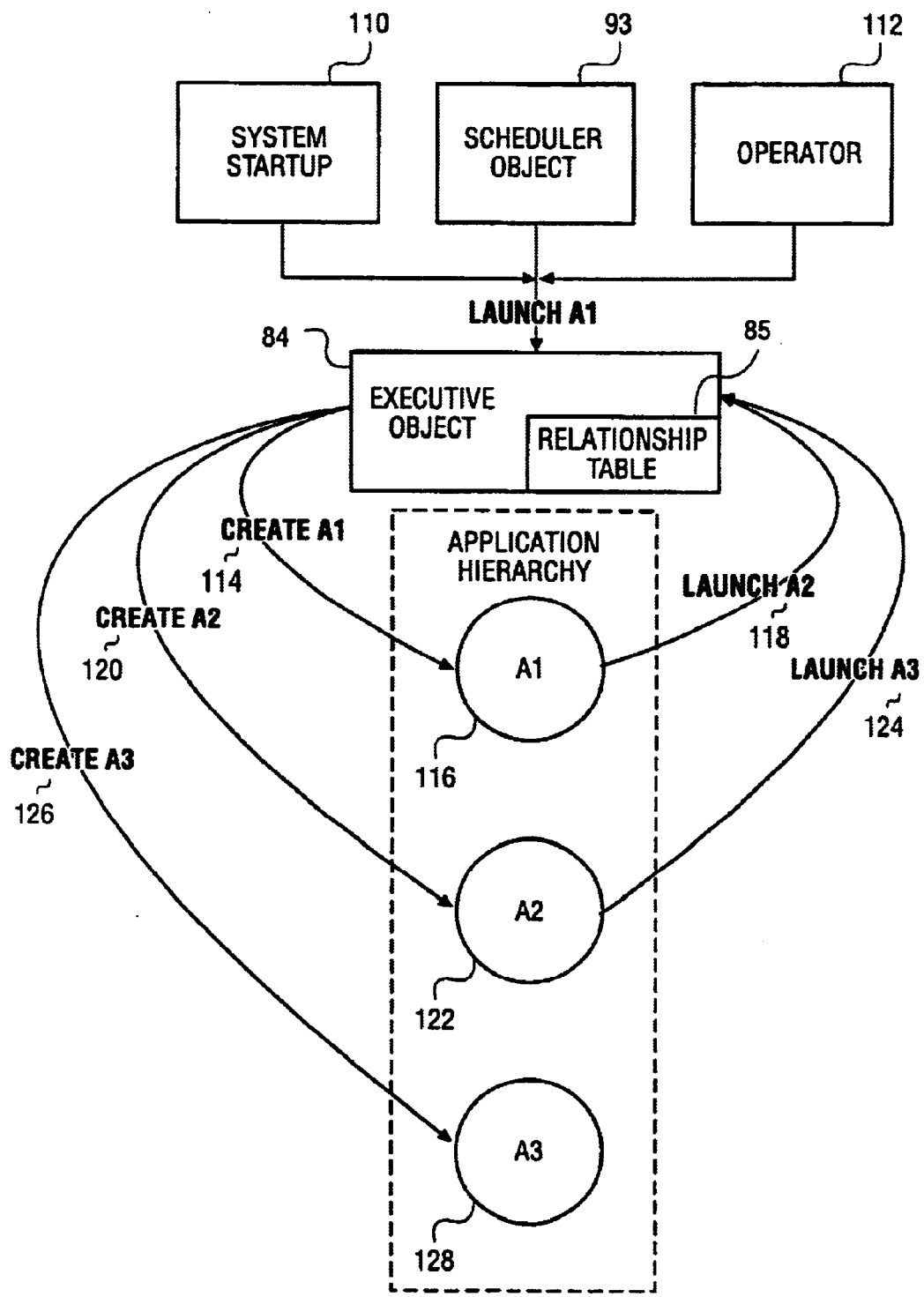
FIG. 6 is a block diagram illustrating the instantiation of application objects by an executive, according to an exemplary embodiment of the present invention.

FIG. 6 is a block diagram illustrating the creation of an application hierarchy 102 of application objects 91.

The executive object 84 is shown to receive a request to launch a particular application (e.g., A1) from the scheduler object 80. Alternatively, the request for the launch of the application may occur at system start up 110, or may be received from an operator 113.

Responsive to the request for the launch of the application, the executive object 84 creates a parent application object 116. An application object 91 maintains status information for an application, and may indicate a number of statuses (e.g., starting, running, stopping or stopped). An application object 91 also maintains timers for an application. The timers may include a keep-alive timer, a stopping state timer, and a starting state timer. For example, the stopping state timer is started when a particular application is shut down. Upon expiration of the stopping state timer, an application may send a message to the executive object 84 requesting time to shut down because the relevant application is not finished a particular task. If no such message is received requesting additional shut down time, or if a predetermined number of requests for additional have been exhausted, the executive object 84 forcibly shuts down the application. The keep-alive timer is used to monitor the health of a particular application. The keep-alive timer is started with the transmission of a keep-alive message from the executive object 84 to an appropriate application object 91. When the keep-alive timer expires, it determines whether the relevant application has responded to the previous keep-alive message. If the application has not responded, it can be determined that there is an unexpected failure of the application. An application object 91 is also responsible for maintaining the message queue 104 and information concerning the application including relationship information, object ownership information, flag and other information. The relationship information is distinct from the dependency information maintained within the relationship table 85 of the executive object 84. While the relationship information of the relationship table 85 relates to types of relationships, the relationship information maintained by an application object 91 indicates both child and parent application objects 91. A particular application object may also indicate ownership of other objects, such as data table objects. The various flags may be set and reset by the above-discussed timers. Other information stored by an application object 91 may include an application name, a particular command-line appearance, a file name, or any other information required for operation of a particular application.

Returning to the exemplary scenario, the parent application object 116, responsive to a particular information requirement, issues a request at 118 to the executive object 84 for the launch of a further application (e.g., application A2). Specifically, referring to FIG. 5, the parent application object 116 may issue an application launch request to the message queue 104, which is communicated via the system API 86 back to the executive object 84.

Responsive to the receipt of the request for the launch of the further application A2, at 120 the executive object 84 creates a child application object 112 as part of the application hierarchy 102.

In the exemplary scenario, the child application object 122 has an information requirement that necessitates the launch of a further application (e.g., application A3). Accordingly, at 124, the child application object 122 issues an application launch request to the executive object 84, in the manner discussed above.

Responsive to the receipt of the request to the launch of the further application, the executive object 84, at 126, creates a grandchild application object 128.

Accordingly, it would be appreciated that the executive object 84 has created a hierarchy 102 of application objects.

Methodology—Maintenance of Hierarchy of Application Objects

Figure 7A:
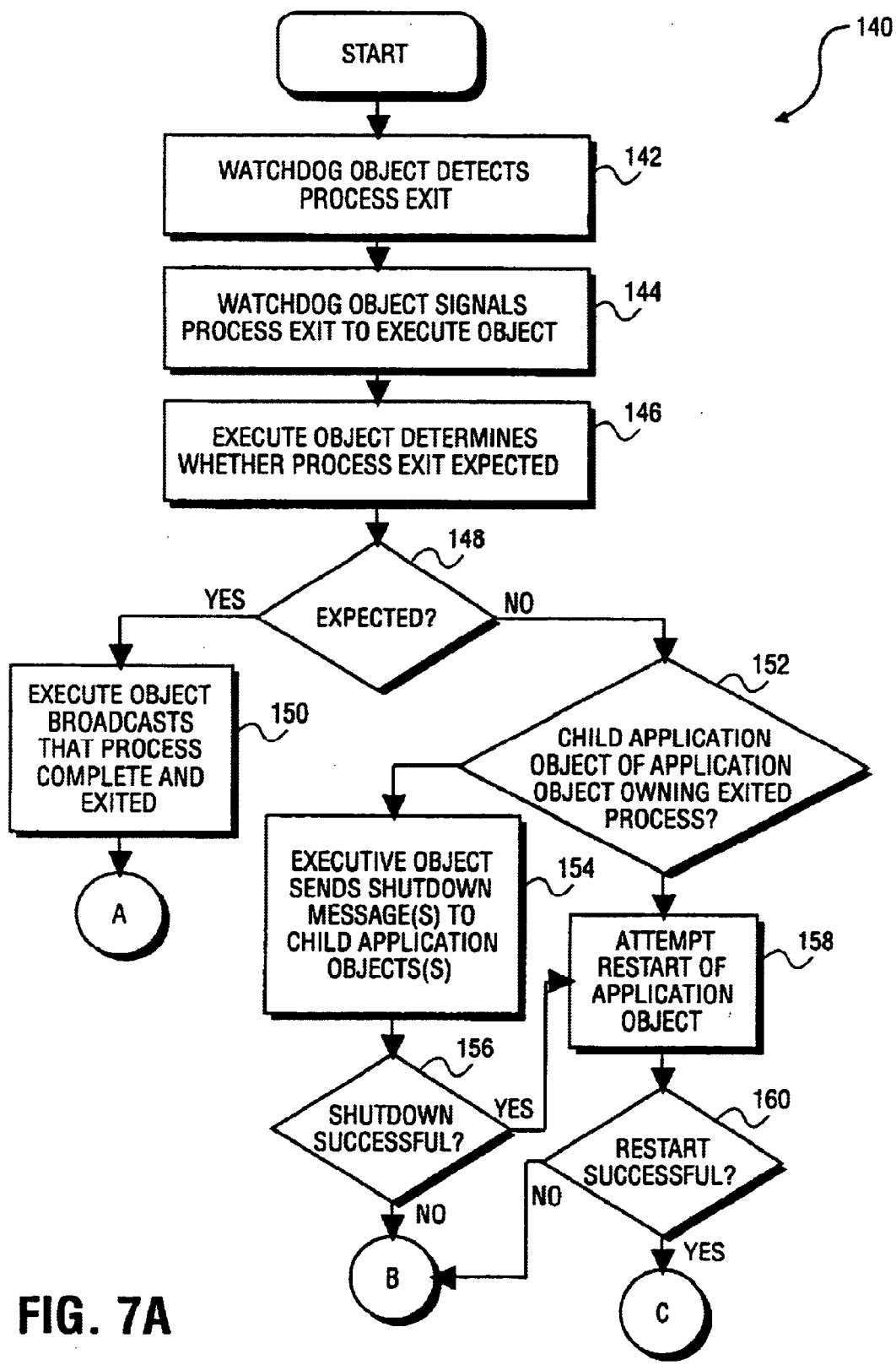
FIGS. 7A–7B show a flow chart illustrating a method, according to an exemplary embodiment of the present invention, of maintaining a hierarchy of application objects.
Figure 7B:
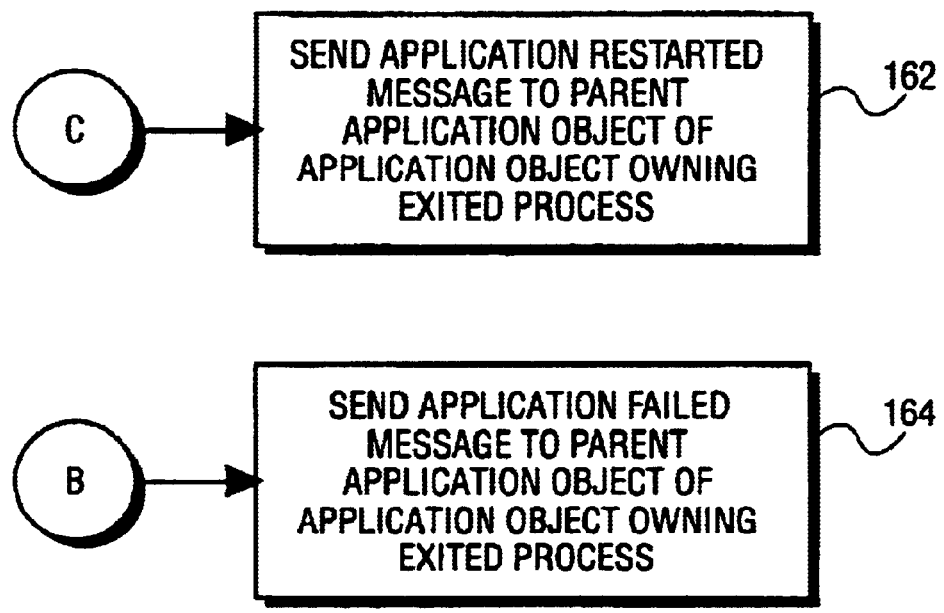

FIGS. 7A and 7B show a flow chart illustrating a method 140, according to an exemplary embodiment of the present invention, of maintaining a hierarchy of application objects and facilitating the recovery from an application failure.

The method 140 commences at block 142 with the watchdog object 84 detecting the exiting of a process 90. The process exit may be as a result of a failure of the process (e.g., the process becomes "hung"), as a result of the process being instructed to exit (e.g., by the executive object 84), or as a result of the process 90 completing.

At block 144, the watchdog object 94 signals the process exit to the executive object 84 via the appropriate API.

At block 146, the executive object 84 determines whether the process exit was expected or not. For example, the executive object 84 may determine whether it itself instructed the process to exit for one or other reason.

In the event that the process exit was expected was expected, at block 150, the executive object 84 broadcasts (e.g., via the broadcast server object 100 and a broadcast client object) that the relevant process 90 has exited in an unexpected expected manner. In this way, further objects that may be required to take action upon the completion of the process, or that may be waiting on the results of a process, are advised and can proceed to take actions as appropriate.

On the other hand, should it be determined that the process exit was unexpected, at decision block 152, the executive object 84 determines whether the exiting process 90 was owned by an application object 91 that has a "child" application object 91. Specifically, the relationship and dependency information that is maintained by the relevant application object 91 is referenced to identify any "child" application objects 91.

If so, at block 154, the executive object 84 sends shut down messages to all identified child application objects 91 of the application object 91 owning the failed process 90. It will be appreciated that this is required to insure that no orphan application objects 91, and accordingly orphan processes 90, remain extant. Following a determination that the shut down of the child application objects 91, at block 154, was successful at decision block 156, or following a determination that no child application objects 91 exist at decision block 152, at block 154 the executive object 84 attempts to restart the failed application object 91. In one embodiment, the executive object 84 causes the creation of a new process identifier for a restarted process 90 of the failed object 91, and replaces a process identifier for an exited process with the newly created process identifier within the process list 95 of the watchdog object 94.

At decision block 160, a determination is made as to whether the restart of the failed application object 91 was successful or not. In the event that the restart of the application object 91 was successful, at block 162 the executive object 84 sends a "restarted message" to any "parent" application objects 91 of the application object owning the exited and restarted process. Again, such "parent" application objects are identified by performing a lookup of relationships and dependencies between application objects 91 maintained by the restarted application object 91.

On the other hand, should the shutdown attempted at block 154, or the restart attempted at 158, be unsuccessful, the method 140 proceeds to block 164. At block 164, the executive object 84 sends a "failed message" to any "parent" application objects 91 of the application object 91 owning the exited process.

Figure 8A:
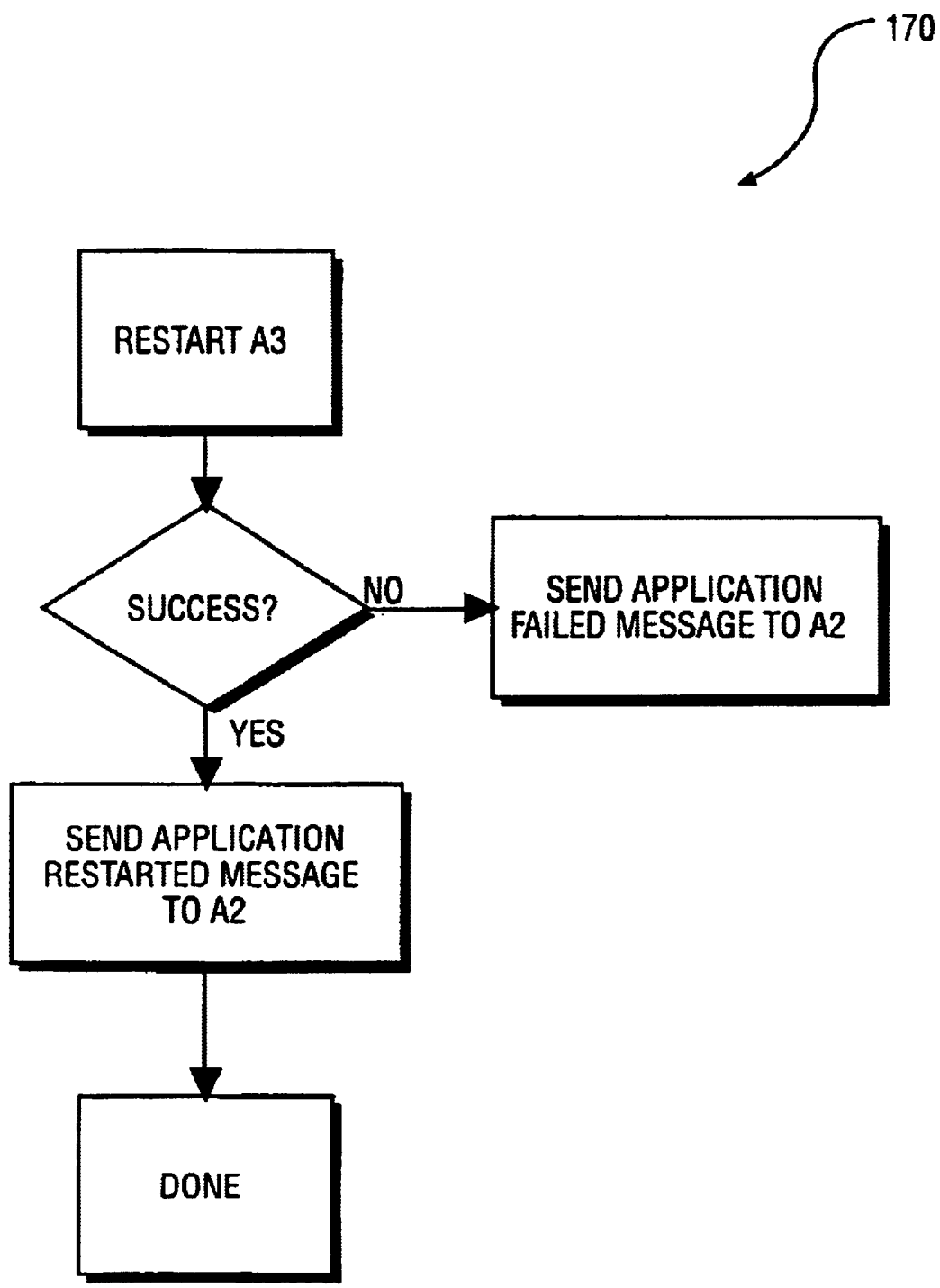
FIGS. 8A–8C are flow charts illustrating exemplary operations that may be performed responsive to the exiting of processes of the application objects that are shown to be instantiated in FIG. 6.
Figure 8B:
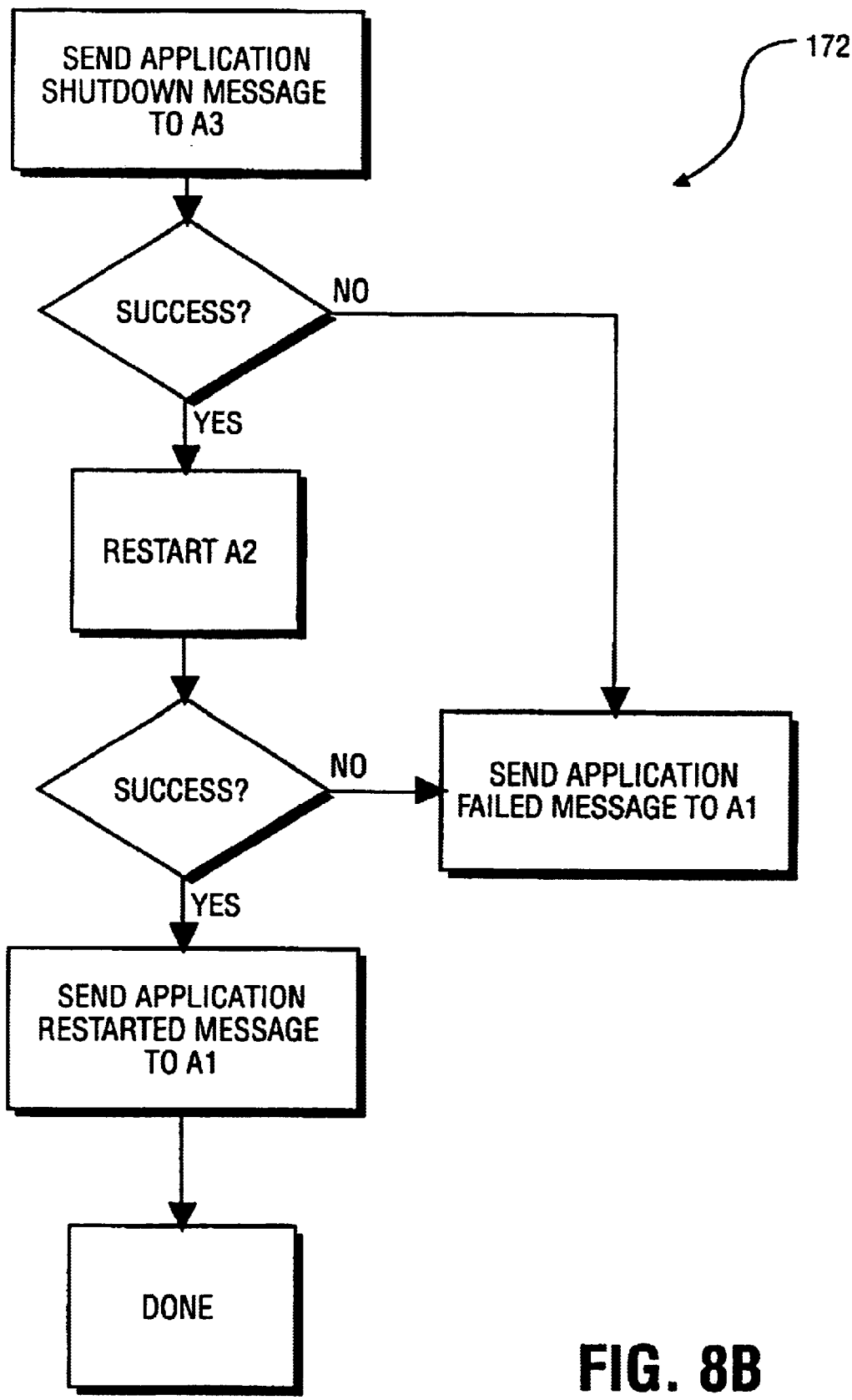
Figure 8C:
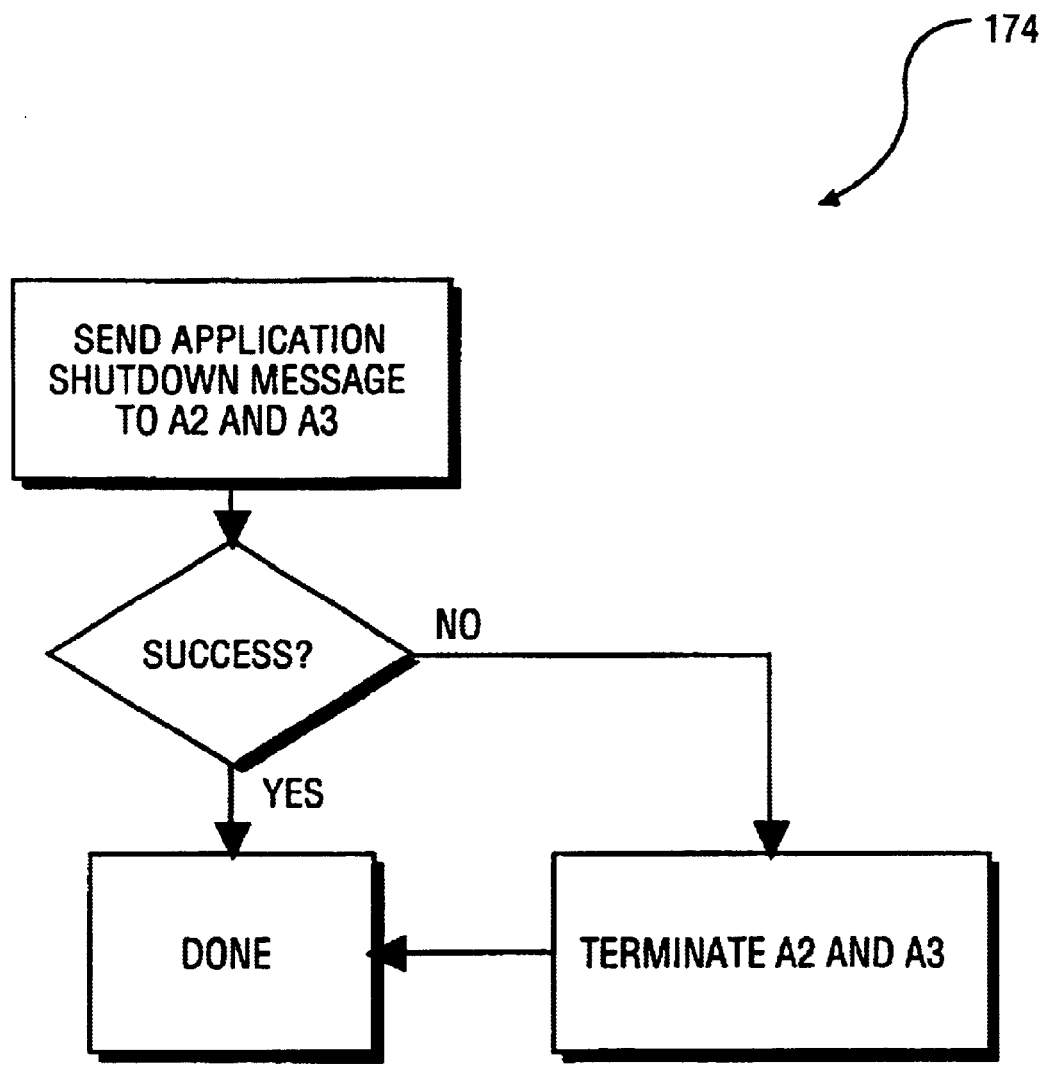

FIGS. 8A–8C are flow charts detailing respective scenarios 170, 172 and 174 that may occur, in accordance with the method 140 described with reference to FIGS. 7A and 7B, upon the unexpected exiting of processes for the parent, child and grandchild application objects 116, 122 and 128 shown in FIG. 6. Specifically, FIG. 8A illustrates a first exemplary scenario 170, according to a present invention, that may occur upon the grandchild application object 128 experiencing an unexpected exit. FIG. 8B illustrates a further exemplary scenario 170 that may transpire upon the child application object 122 experiencing an unexpected exit. Finally, FIG. 5C illustrates an exemplary scenario 174 that may transpire upon the parent application object 116 experiencing an unexpected exit.

Computer System

Figure 9:
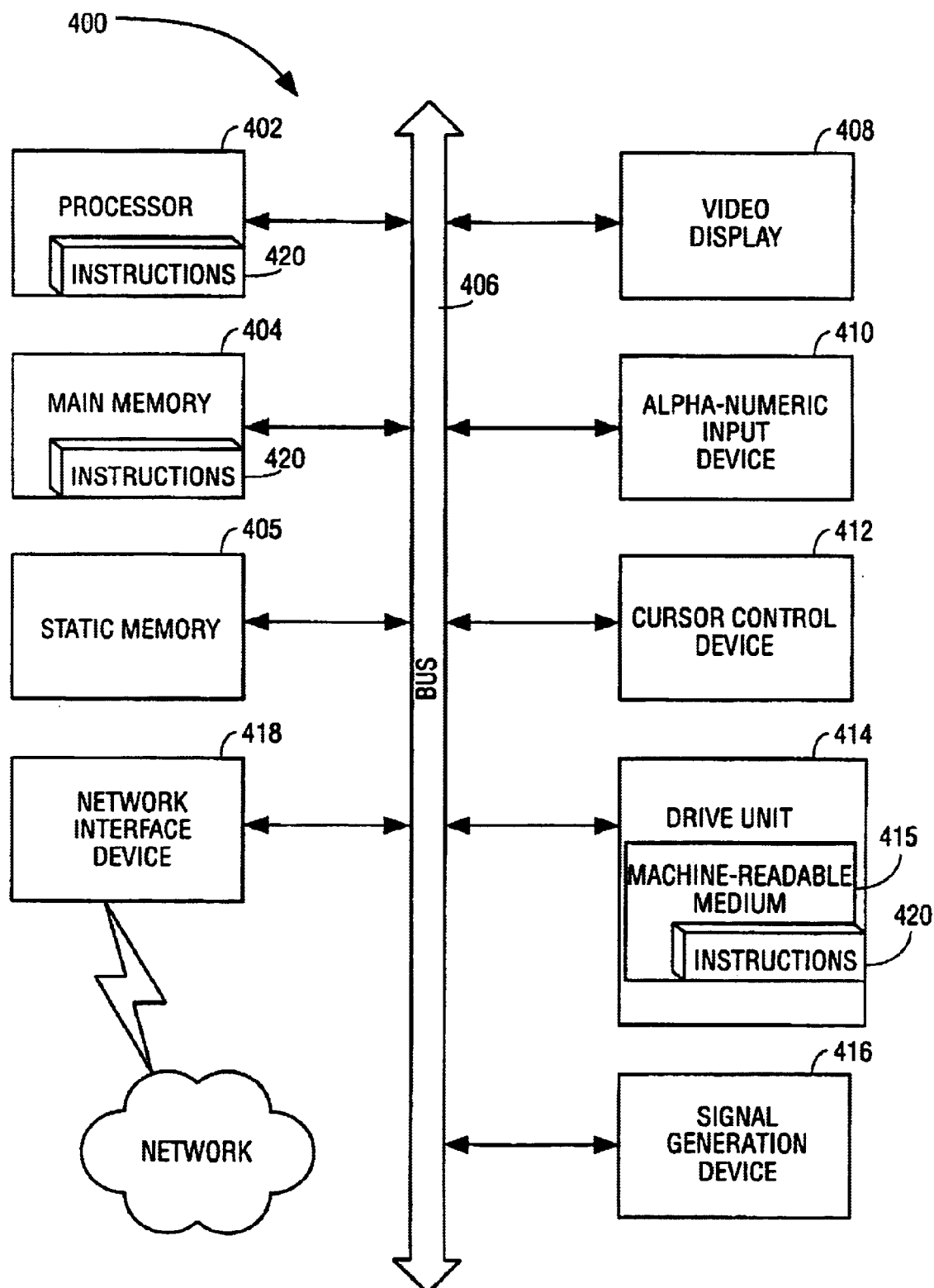
FIG. 9 is a block diagram illustrating a machine, in the exemplary form of a computer system, within which is a set of instructions for causing the computer system to perform the methodologies discussed below may be executed.

FIG. 9 shows a diagrammatic representation of machine in the exemplary form of a computer system 400 within which a set of instructions, for causing the machine to perform any one of the methodologies discussed above, may be executed. The computer system 400 and includes a processor 402, a main memory 404 and a static memory 405, which communicate with each other via a bus 406. The computer system 400 is further shown to include a video display unit 408 (e.g., a liquid crystal display (LCD) or a cathode ray tube (CRT)). The computer system 400 also includes an alpha-numeric input device 410 (e.g. a keyboard), a cursor control device 412 (e.g., a mouse), a disk drive unit 414, a signal generation device 416 (e.g., a speaker) and a network interface device 418. The disk drive unit 414 includes a computer-readable medium 415 on which is stored a set of instructions (i.e., software) 420 embodying any one, or all, of the methodologies described above. The software 420 is also shown to reside, completely or at least partially, within the main memory 404 and/or within the processor 402. The software 420 may further be transmitted or received via the network interface device 418. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Thus, a method and system to maintain a hierarchy of instantiated application objects have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method to maintain a hierarchy of application objects in a computer system, the method including:

automatically detecting an exit of a child application object launched by a parent application object, wherein the computer system which maintains the hierarchy of application objects, the parent application object, and a grandchild application object, launched by the child application object, remain active;

automatically terminating the grandchild application object after the exit of the child application object;

automatically determining whether the exit of the child application object was expected;

automatically attempting restart of the child application object if the exit of the child application object was unexpected; and automatically signaling an outcome of the attempted restart of the child application object to the parent application object that launched the child application object prior to the exit of the child application object.

2. The method of claim 1 including maintaining an application hierarchy by recording a hierarchical relationship between the parent, child and grandchild application objects.

3. The method of claim 2 wherein the maintaining of the application hierarchy includes launching the parent application object, launching the child application object responsive to a request from the parent application object, and launching the grandchild application object responsive to a request from the child application object.

4. The method of claim 1 wherein, if the restart of the child application object is successful, then communicating a restart message to the parent application object to inform the parent application object of the successful restart.

5. The method of claim 1 wherein, if the restart of the child application object is not successful, then communicating a failure message to the parent application object to inform the parent application object of the failed restart.

6. The method of claim 1 wherein the automatic detecting of the exit of the child application object includes detecting hanging of a process of the child application object.

7. The method of claim 1 wherein, if the restart of the child application object is successful, then creating a new process identifier for the process of the child application object.

8. A system to maintain a hierarchy of application objects, the system including:

a watchdog automatically to detect an exit of a child application object that was launched by a parent application object wherein the system that launched the parent application object and the child application object, remains active; and an executor to automatically terminate a grandchild application object launched by the child application object after the exit of the child application object, to automatically determine whether the exit of the child application object was expected, to automatically attempt restart of the child application object if the exit of the child application object was unexpected, and to automatically signal an outcome of the attempted restart of the child application to the parent application object.

9. The system of claim 8 wherein the executor is to maintain an application hierarchy recording a hierarchical relationship between the parent, child and grandchild application objects.

10. The system of claim 9 wherein the executor is to launch the parent application object, to launch the child application object responsive to a request from the parent application object, and to launch the grandchild application object responsive to a request from the child application object.

11. The system of claim 8 wherein, if the restart of the child application object is successful, the executor is to communicate a restart message to the parent application object.

12. The system of claim 8 wherein, if the restart of the child application is not successful, the executor is to communicate a failure message to the parent application object.

13. The system of claim 8 wherein the watchdog is to automatically detect the exit of the child application object by detecting a hang state for a process of the child application object.

14. The system of claim 8 wherein the executor, if the restart of the child application is successful, is to create a new process identifier for a process of the child application object.

15. A machine-readable medium storing a sequence of instructions that, when executed by a machine, cause the machine to:

- automatically detect an exit of a child application object launched by a parent application object wherein the parent application and a grandchild application object launched by the child application object, remain active;
- automatically terminate the grandchild application object after the exit of the child application object;
- automatically determining whether the exit of the child application object was expected;
- automatically attempting restart of the child application object if the exit of the child application object was unexpected; and
- automatically signal an outcome of the attempted restart to the parent application object that launched the child application object prior to the exit of the child application object.

16. A system to maintain a hierarchy of application objects, the system including:

- first means for automatically detecting an exit of a child application object, wherein the parent application and a grandchild application object launched by the child application object, remain active; and
- second means for automatically terminating the grandchild application object after the exit of the child application object, for automatically determining whether the exit of the child application object was expected, for automatically attempting restart of the child application object if the exit of the child application object was unexpected, and for automatically signaling an outcome of the attempted restart to the parent application object that launched the child application object prior to the exit of the child application object.

* * * * *

UNITED STATES PATENT AND TRADEMARK OFFICE
CERTIFICATE OF CORRECTION

PATENT NO. : 6,883,170 B1
DATED : April 19, 2005
INVENTOR(S) : Kevin Garcia

It is certified that error appears in the above-identified patent and that said Letters Patent is hereby corrected as shown below:

<u>Title page, Item [54] and Column 1, line 4,</u>
Title, delete "APPLICATIONS" and insert -- APPLICATION --, therefor.

<u>Column 12,</u>
Line 31, after "object" insert -- , --.

<u>Column 13,</u>
Line 5, after "object" insert -- , --.

Signed and Sealed this

Twenty-eighth Day of June, 2005

JON W. DUDAS
*Director of the United States Patent and Trademark Office*